United States Patent [19]
Genbauffe

[11] 3,936,919
[45] Feb. 10, 1976

[54] PLURAL RANGE PRESSURE REGULATOR CONSTRUCTION OR THE LIKE AND THE METHOD OF MAKING THE SAME OR THE LIKE

[75] Inventor: Francis S. Genbauffe, Irwin, Pa.

[73] Assignee: Robertshaw Controls Company, Richmond, Va.

[22] Filed: May 16, 1974

[21] Appl. No.: 470,435

Related U.S. Application Data

[62] Division of Ser. No. 320,520, Jan. 2, 1973, Pat. No. 3,825,029.

[52] U.S. Cl............... 29/157.1 R; 29/436; 29/454; 267/168
[51] Int. Cl.²..................... B23P 15/00; F16K 31/12
[58] Field of Search............... 29/157.1 R, 436, 454; 137/505.41, 505.42, 505, 271; 267/168

[56] References Cited
UNITED STATES PATENTS

| 2,478,040 | 8/1949 | Campbell, Jr. et al. | 137/505.42 |
| 2,653,793 | 9/1953 | St. Clair | 251/367 |
| 2,760,507 | 8/1956 | Miller | 137/63 R |
| 2,887,123 | 5/1959 | Becker | 137/505.41 |
| 3,056,424 | 10/1962 | Courtot et al. | 251/367 |
| 3,448,764 | 6/1969 | Dykzeul et al. | 137/505.41 |
| 3,747,629 | 6/1972 | Bauman | 137/505.41 |

Primary Examiner—Carl E. Hall
Assistant Examiner—Dan C. Crane
Attorney, Agent, or Firm—Candor, Candor & Tassone

[57] ABSTRACT

A plural range pressure regulator construction having a housing provided with an inlet and an outlet separated by a valve seat that is controlled by a valve member that is interconnected to a flexible wall carried by the housing. Biasing means are carried by the housing for acting on one side of the wall to tend to move the wall in one direction relative to the housing, the biasing means comprising a plurality of separate spring means each acting on the wall to provide one pressure range for the pressure regulator construction. The housing has a storage space for storing one of the spring means so that the same will not act on the wall whereby the remaining spring means acting on the wall will provide another pressure range for the pressure regulator construction.

5 Claims, 3 Drawing Figures

PLURAL RANGE PRESSURE REGULATOR CONSTRUCTION OR THE LIKE AND THE METHOD OF MAKING THE SAME OR THE LIKE

This application is a divisional patent application of its copending parent application Ser. No. 320,520, filed Jan. 2, 1973, now U.S. Pat. No. 3,825,029.

This invention relates to a plural range pressure regulator construction or the like as well as to a method for making such a pressure regulator construction or the like.

It is well known that pressure regulators have been provided for fuel burning apparatus to maintain the fuel being supplied from a fuel source to the fuel burning apparatus at a proper pressure level for proper operation of the fuel burning apparatus. It is also well known that various sources of fuel can be provided for the same fuel burning apparatus, such as a natural gas source and an LPG sources whereby the outlet pressure of the pressure regulator must be different for the different fuel sources in order for the fuel burning apparatus to function properly.

Accordingly, it is a feature of this invention to provide an improved plural range pressure regulator construction that is adapted to be easily converted from one outlet pressure thereof to another outlet pressure thereof.

In particular, one embodiment of this invention provides a plural range pressure regulator construction having a housing means provided with an inlet and an outlet separated by a valve seat opened and closed by a movable valve member that is carried by a flexible wall or diaphragm which, in turn, is carried by the housing means. Biasing means are carried by the housing means for acting on one side of the wall to tend to move the flexible wall or diaphragm in one direction relative to the housing means. The biasing means comprises a plurality of separate spring means each acting on the wall to provide one pressure range for the pressure regulator construction, such as for an LPG fuel source. The housing means has a storage space for storing one of the spring means so that the same will not act on the wall whereby the remaining spring means acting on the wall will provide another pressure range for the regulator construction, such as for a natural gas fuel source.

In this manner, the plural range pressure regulator construction can readily be converted between different outlet pressures thereof for use with different fuel sources by merely changing the location of one of the spring means thereof as will be apparent hereinafter.

Therefore, it is an object of this invention to provide an improved plural range pressure regulator construction or the like, the construction having one or more of the novel features set forth above or hereinafter shown or described.

Another object of this invention is to provide a method for making such a plural range pressure regulator construction or the like.

Another object of this invention is to provide an improved plural range biasing construction, the construction having one or more of the novel features set forth above or hereinafter shown or described.

Another object of this invention is to provide a method for making such a plural range biasing construction or the like.

Other objects, uses and advantages of this invention are apparent from a reading of this description with proceeds with reference to the accompanying drawings forming a part thereof and wherein.

Figure 1:
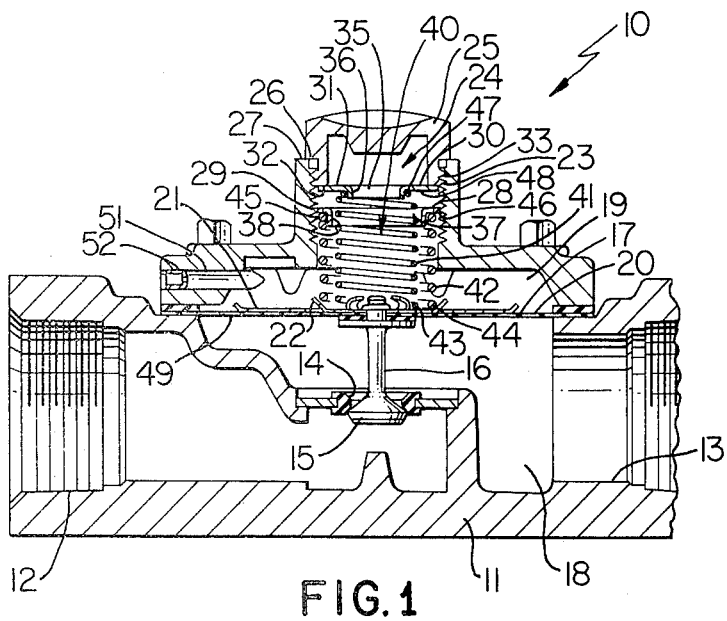
FIG. 1 is a cross-sectional view of the plural range pressure regulator construction of this invention set for one pressure range thereof.
Figure 3:
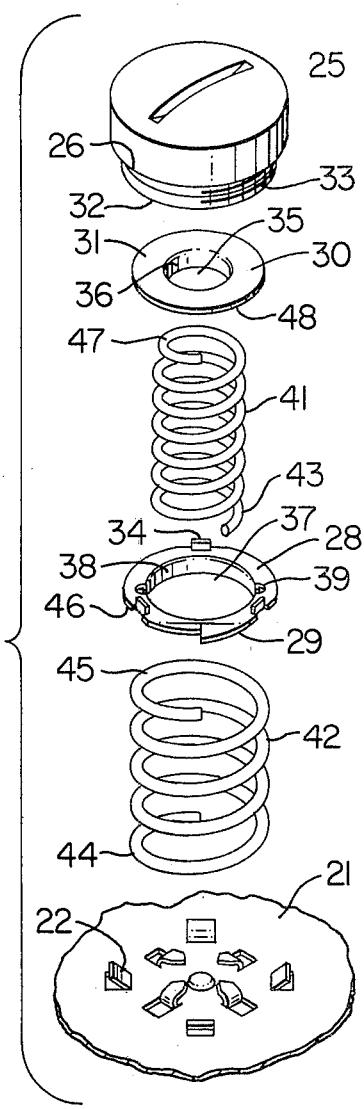
FIG. 3 is an exploded perspective view of the various parts utilized to convert the pressure regulator construction from one pressure range thereof to another pressure range thereof.

While the various features of this invention are hereinafter described and illustrated as being particularly adapted for providing a plural range pressure regulator construction for a fuel burning apparatus, it is to be understood that the various features of this invention can be utilized singly or any combination thereof to provide a plural range biasing means for other devices as desired.

Therefore, this invention is not to be limited to only the embodiments illustrated in the drawings, because the drawings are merely utilized to illustrate one of the wide variety of uses of this invention.

Referring now to the drawings, the improved plural range pressure regulator construction of this invention is generally indicated by the reference numeral 10 and comprises a housing means 11 having an inlet 12 and an outlet 13 interconnected together by a resilient valve seat means 14 that is adapted to be controlled by a valve member 15 disposed on the inlet side of the valve seat 14 and being interconnected by a stem 16 thereof that projects through the valve seat 14 to a flexible diaphragm or wall 17 carried by the housing means 11 and cooperating therewith to define a chamber 18 on the outlet side of the diaphragm 17 and another chamber 19 on the other side 20 of the diaphragm 17 for a purpose hereinafter described.

The upper side 20 of the diaphragm 17 has a metallic backup plate 21 secured thereto by the stem 16 of the valve member 15 in the manner illustrated with the backup plate 21 having a plurality of upwardly bent tabs 22 to provide a spring retaining function as will be apparent hereinafter.

The housing 11 has an internally threaded bore portion 23 leading to the chamber 19 and defining a storage space 24 for a purpose hereinafter described, the storage space 24 having its upper end closed by a removable cover member or end cap 25 threaded to the threaded portion 23 and having an annular flange 26 thereof adapted to abut against the top surface 27 of the housing 11 to limit the amount of insertion of the cover member 25 into the housing means 11.

Figure 2:
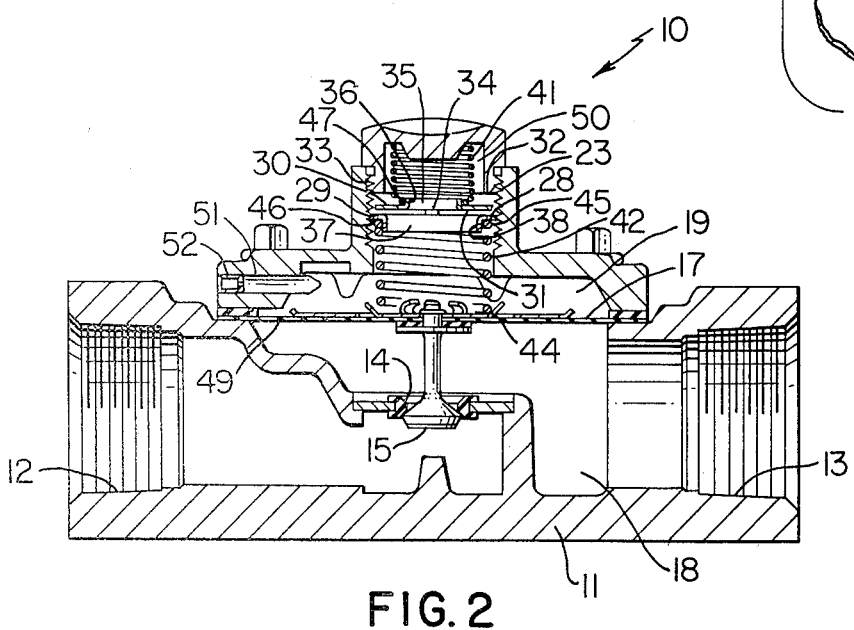
FIG. 2 is a view similar to FIG. 1 and illustrates the plural range pressure regulator construction set for another pressure range thereof.

A first spring retainer 28 is of annular configuration and has its outer periphery 29 formed in such a manner that the same can be threaded to the threaded portion 23 of the housing 11 and thus be positioned in a preselected axial position therein in the manner illustrated in FIGS. 1 and 2.

Another annular spring retainer 30 of this invention is adapted to be loosely disposed in the threaded portion 23 of the housing 11 and have its upper surface 31 abut against the lower surface 32 of the threaded portion 33 of the end cap 25 in the manner illustrated in FIG. 1 or have the surface 31 thereof disposed on upwardly directed tabs 34 of the other spring retainer 28 in the manner illustrated in FIG. 2, the spring retainer 30 having an opening 35 passing therethrough and defining a cylindrical flange 36 extending therefrom. Similarly, the other annular spring retainer 28 has an opening 37 passing therethrough and defining a cylindrical flange 38 extending therefrom.

If desired, the annular spring retainer 28 can have suitable notches 39 formed therein to facilitate the inward and outward threading thereof in the threaded portion 23 of the housing 11 by an appropriate tool inserted in such notches 39.

A biasing means of this invention is generally indicated by the reference numeral 40 and comprises a pair of coiled compression springs 41 and 42 adapted to be concentrically disposed in the housing means 11 in the manner illustrated in FIG. 1 with the lower ends 43 and 44 of the springs 41 and 42 respectively bearing against the backup plate 21 of the flexible wall 17 to act in a direction to tend to open the valve member 15 away from the valve seat 14 for a purpose that will be apparent hereinafter, the lower end 44 of the outer spring 42 nesting within the tabs 22 of the backup plate 21 whereby the tabs 22 provide a spring retaining function for the spring 42.

The upper end 45 of the outer spring 42 encircles the cylindrical flange 38 of the threaded spring retainer 28 and bears against the under surface 46 thereof in the manner illustrated in FIGS. 1 and 2.

The upper end 47 of the inner spring 41 is adapted to encircle the cylindrical flange 36 of the upper spring retainer 30 and bear against the under surface 48 thereof.

In this manner, it can be seen that when both springs 41 and 42 are assembled in the housing means 11 in the manner illustrated in FIG. 1, the spring retainers 28 and 30 support the upper ends 45 and 47 of the springs 42 and 41 while the lower ends 43 and 44 thereof respectively act against the flexible wall 17 of the pressure regulator construction 10 to tend to move the valve member 15 away from the valve seat 14 with a certain force that is the sum of the forces of the two springs 41 and 42 acting downwardly in FIG. 1.

Thus, when a fuel source is interconnected to the inlet 12, such as an LPG fuel source the fuel passes through the open valve seat 14 to the outlet 13. However, the pressure of the fuel passing through the open valve seat 14 builds up in the chamber 18 and acts against the under side 49 of the flexible wall 17 in opposition to the force of the springs 41 and 42 tend to move the valve member 15 upwardly in FIG. 1 and, thus, close the valve seat 14. In this manner, the pressure in the chamber 18 and, thus, to the outlet 13 is maintained at a certain pressure value regardless of the pressure value of the fuel being directed to the inlet 12 of the housing means 11 as the position of the valve member 15 relative to the seat 14 will assure that the fuel pressure in the chamber 18 and being directed to the outlet 13 will remain at a certain pressure level as determined by the combined force of the springs 41 and 42 in a manner well known in the art.

When it is desired to change the pressure range of the pressure regulator construction 10 to another pressure range thereof, such as for being interconnected to a natural gas fuel source, the cap 25 is unthreaded from the threaded portion 23 of the housing 11 and removed therefrom as well as the spring retainer 30 and inner spring 41. The spring retainer 30 is then turned over in the manner illustrated in FIG. 2 and inserted back through the threaded portion 23 of the housing 11 to have the surface 31 thereof rest against the upwardly directed tabs 34 of the lower spring retainer 28 as illustrated in FIG. 2. If the end coil 47 of the inner spring 41 has been tightly fitted around the cylindrical flange 36 of the spring retainer 30, the same will have remained attached thereto so that when inverting the spring retainer 30 to insert the same downwardly through the threaded portion 23 of the housing 11 in the manner illustrated in FIG. 2, the inner spring 41 now projects upwardly therefrom out through the threaded portion 23 and is adapted to have its end 44 received in a chamber 50 formed in the end cap 25 when the end cap 25 is again threaded to the threaded portion 23 of the housing 11 in the manner illustrated in FIG. 2. Thus, the inner spring 41 is compressed between the end cap 25 and the spring retainer 30 in the storage space 24 of the housing means 11 so that the same has no affect on the movable wall 17 of the pressure regulator construction 10. Of course, if the spring 41 becomes separated from the spring retainer 30 during the changeover from the condition of FIG. 1 to the condition of FIG. 2, the spring 41 is inserted on top of the inverted retainer 30 in the manner illustrated in FIG. 2 to be stored in the storage space 24 as previously stated.

When the pressure regulator construction 10 is disposed in the condition illustrated in FIG. 2, it can be seen that only the compression spring 42 is now acting in a downward direction on the flexible wall 17 so that the valve member 15 is moved away from the valve seat 14 by only the force of the compression spring 42 whereby the pressure regulator construction 10 will tend to maintain a lesser pressure value of the fuel in the chamber 18 and at the outlet 13 thereof than when both springs 41 and 42 were utilized in the manner illustrated in FIG. 1.

Therefore, it can be seen that this invention provides a pressure regulator construction that can readily be converted from one pressure range thereof to another pressure range thereof by merely changing the position of one spring thereof from a stored condition thereof to an active force applying condition thereof in a simple and effective manner.

Thus, when it is desired to convert the regulator construction 10 from the condition illustrated in FIG. 2 to the condition illustrated in FIG. 1, the end cap 25 is removed and the spring 41 and its retainer 30 are inverted from the position illustrated in FIG. 2 to the position illustrated in FIG. 1 whereby when the end cap 25 is replaced, both springs 41 and 42 will now act on the movable wall 17 for the reasons previously set forth.

Of course, the chamber 19 of the pressure regulator construction 10 is adapted to be interconnected to the atmosphere in any desired manner. For example, in the embodiment illustrated in the drawings, the housing means 11 is provided with a passage means 51 leading from the chamber 19 to the exterior of the housing means 11 and having a suitable restrictor 52 therein to slow down the movement of the diaphragm 17 from its various operating positions in much the same manner as a dashpot or the like.

Thus, it can be seen that this invention not only provides an improved plural range pressure regulator construction and method of making the same, but also this invention provides an improved plural range biasing construction and method of making the same.

While the form and the method of this invention now preferred has been described and illustrated as required by the Patent Statutes, it is to be understood that other forms and methods can be utilized and still come within the scope of the appended claims.

What is claimed is:

1. A method for making a plural range pressure regulator construction comprising the steps of providing a housing means with an inlet and an outlet separated by a valve seat and with a valve member for controlling said valve seat and being interconnected to a flexible wall carried by said housing means and controlling the movement thereof relative to said valve seat, disposing biasing means in said housing means for acting on one side of said wall to tend to move said wall in one direction relative to said housing means, said biasing means comprising a plurality of separate spring means, causing each spring means to act on said wall to provide one pressure range for said regulator construction, storing one of said spring means completely in a storage space of said housing means so that the same will not act on said wall whereby the remaining spring means acting on said wall will provide another pressure range for said regulator construction, forming said one spring means and said remaining spring means from coiled compression springs, causing said springs to be concentrically disposed and each having one end thereof operatively engaging said wall to provide said one pressure range for said regulator construction, and forming said storage space for said one spring means to be located in aligned relation with said remaining spring means and adjacent the other end thereof so as to be completely spaced from said wall a distance at least equal to the length of said remaining spring means whereby said one spring means is out of operative engagement with said wall and completely spaced therefrom a distance at least equal to the length of said remaining spring means when said other pressure range is being provided.

2. A method for making a plural range pressure regulator construction comprising the steps of providing a housing means with an inlet and an outlet separated by a valve seat and with a valve member for controlling said valve seat and being interconnected to a flexible wall carried by said housing means and controlling the movement thereof relative to said valve seat, disposing biasing means in said housing means for acting on one side of said wall to tend to move said wall in one direction relative to said housing means, said biasing means comprising a plurality of separate spring means, causing each spring means to act on said wall to provide one pressure range for said regulator construction, storing one of said spring means in a storage space of said housing means so that the same will not act on said wall whereby the remaining spring means acting on said wall will provide another pressure range for said regulator construction, forming said one spring means and said remaining spring means from coiled compression springs, concentrically disposing said spring means when they are to act on said wall to provide said one pressure range for said regulator construction, forming said storage space for said one spring means in aligned relation with said remaining spring means and adjacent one end thereof, closing one end of said storage space that is remote from said one end of said remaining spring means with a removable cover means, and storing said one spring means in compressed relation between said cover means and said one end of said remaining spring means when the same is stored in said storage space.

3. A method for making a plural range pressure regulator construction as set forth in claim 2 and including the steps of forming said cover means with a spring retainer, causing said one spring means to have one end thereof bearing against said spring retainer when the other end of said one spring means is acting on said wall to provide said one pressure range of said regulator construction, causing said one spring means to be disposed between said cover means and said spring retainer when said one spring is stored in said storage space.

4. A method for making a plural range pressure regulator construction as set forth in claim 3 and including the steps of forming said housing means with an internally threaded portion, threading an annular spring retainer to said threaded portion, causing said one end of said remaining spring means to bear against the same, and causing said one spring means to project through said annular spring retainer when said one spring means is acting on said wall to provide said one pressure range of said pressure regulator construction.

5. A method for making a plural range pressure regulator construction as set forth in claim 4 and including the step of threading said cover member to said threaded portion of said housing when closing said one end of said storage space.

* * * * *